Patented May 17, 1938

2,117,498

UNITED STATES PATENT OFFICE 2,117,498

PROCESS FOR POLYMERIZATION OF OLEFINES

Johannes Nicolaas Jacobus Perquin, The Hague, Netherlands, assignor to Shell Development Company, San Francisco, Calif., a corporation of Delaware No Drawing. Application February 1, 1937, Serial No. 123,482. In the Netherlands February 11, 1936

4 Claims. (Cl. 196—78)

This invention deals with the polymerization of olefines to produce lubricating oils, and more particularly is concerned with the polymerization of long chain olefines by means of aluminum chloride containing small amounts of water to produce high viscosity index lubricating oils.

In the production of synthetic lubricating oils possessing high viscosity index by polymerization of a cracked distillate containing long chain olefines of the type obtained by cracking paraffin wax in the vapor phase, the yield of a suitable lubricating oil, as measured by the amount and the viscosity of the product after removal of unconverted components, may vary a great deal depending upon the conditions of polymerization. Obviously, an amount of a product having a relatively high viscosity is more desirable than an equal amount of a product of a lower viscosity, provided other important properties of the more viscous product, as viscosity index, resistance to oxidation, absence of gums and gum-forming substances, etc. are at least equal, if not superior, to those of the less viscous product.

By long chain olefines, as herein defined, I mean olefines which upon polymerization are capable of yielding lubricating oils having viscosity indexes of about 100 and higher, comprising predominantly normal olefines of five and/or more carbon atoms and boiling preferably between about 60° and 300° C. For the production of high-grade lubricating oils from such long chain olefines by catalytic polymerization, anhydrous aluminum chloride is the only suitable catalyst, other powerful polymerization catalysts, as boron fluoride, being unsuited for this purpose.

Thus when, for instance, comparing the polymerization of a cracked distillate boiling up to 280° C. obtained by cracking wax in the vapor phase by the actions of boron fluoride and aluminum chloride, respectively, under suitable polymerization conditions, the following results were obtained which clearly show that boron fluoride and aluminum chloride are not equivalents in the matter of producing lubricating oils from such distillates, boron fluoride producing principally lower polymers thereof, i. e. dimers and trimers, which are unsuited for lubricants, in contrast to aluminum chloride which produces predominantly polymers higher than trimers.

| Catalyst | Polymerization | | | Product | |
|---|---|---|---|---|---|
| | Temperature | Time | Pressure | Percent polymerized | Vis. °E. at 50° C. |
| *Percent* | ° C. | Hours | Atm. | | |
| $BF_3$ _____3.5 | 100 | 16 | 1 | 34 | 1.97 |
| $BF_3$ _____3.5 | 20 | 18 | 1 | 3 | 5.10 |
| $BF_3$ _____3.5 | 20 | 20 | 1 | 7 | 5.68 |
| $BF_3$ _____2.4 | 20 | 68 | 3.8 | 36 | 3.93 |
| $BF_3$ _____5.0 | 20 | 68 | 7.0 | 43 | 4.02 |
| $BF_3$ _____3.9 | 20 | 90 | 7.5 | 51 | 2.84 |
| $AlCl_3$ ____4.0 | 100 | 2 | 1 | 57.6 | 12.3 |

I have discovered that the polymerization power of anhydrous aluminum chloride for long chain olefines can be greatly enhanced in the desired direction of producing more viscous oils of improved stability, without forming resins or gums, by the addition of small amounts of water varying from less than 1 to 30%, and preferably from 2 to 10% by weight of the aluminum chloride. The water, as I have found, may be added to the aluminum chloride immediately before carrying out the polymerization, or it may be introduced into the mixture of hydrocarbon and aluminum chloride during the polymerization. The latter procedure appears preferable in that it avoids possible premature hydrolysis of the aluminum chloride which might render it ineffective. When polymerizing relatively large quantities of olefines, the normal procedure is gradually to introduce the aluminum chloride into the liquid olefines in a manner to avoid local overheating. In such a case the water also is advantageously added gradually. Under some circumstances the polymerization may be allowed to proceed for some time in the absence of water, and water is added when the reactivity of the catalyst has been reduced noticeably or even completely, whereby the activity of the catalyst is immediately at least partially revived, enabling the continuation of the polymerization.

The following data serve to illustrate the improvement which can be achieved by my process:

Samples of a cracked distillate boiling below 220° C. obtained by vapor phase cracking of paraffin wax were polymerized with aluminum chloride in the absence and in the presence of varying amounts of water. The catalyst and the water, when water was used, were added alternately in small quantities. Test conditions and results are tabulated below:

*Reactants*

| | | | | | | |
|---|---|---|---|---|---|---|
| Distillate, grams | 2000 | 2000 | 2000 | 2000 | 2000 | 2000 |
| AlCl₃, grams | 80 | 80 | 80 | 80 | 80 | 80 |
| Water, grams | 0 | .8 | 1.6 | 8.0 | 16.0 | 24.0 |

*Test conditions*

| | | | | | | |
|---|---|---|---|---|---|---|
| Minimum temp. °C | 4 | 4 | 3 | 3 | 3 | 2 |
| Maximum temp. °C | 31 | 30 | 33 | 37 | 30 | 29 |
| Duration hours | 2 | 2 | 2 | 2 | 2 | 2 |

*Product*

| | | | | | | |
|---|---|---|---|---|---|---|
| Yield percent | 70 | 68.5 | 68.5 | 69 | 68.5 | 68 |
| Vis. °E. at 50° C | 1.8 | 6.1 | 6.3 | 23.9 | 27.9 | 11.1 |
| Bromine No. (McIlhiney) | 71 | 50 | 39 | 17 | 20 | 33.5 |

Although I have in the foregoing example used 4% aluminum chloride based on the distillate, it should be noted that my invention is not limited thereto but that between about 2 to 10% aluminum chloride may be used.

I claim as my invention:

1. In the process of producing synthetic lubricating oils by polymerizing long chain olefines of the type produced in the vapor phase cracking of paraffin, the improvement comprising effecting the polymerization in the presence of from about .2 to 10% by weight of aluminum chloride, based on the olefines, and in the presence of between about 2 and 20% water by weight based on the aluminum chloride, the conditions of reaction and the proportions of materials being such as to produce a polymerized product having a higher viscosity and a lower bromine number as compared with a product produced under the same conditions but without the ratio of water set forth.

2. In the process of producing synthetic lubricating oils by polymerizing long chain olefines of the type produced in the vapor phase cracking of paraffin, the improvement comprising mixing anhydrous aluminum chloride with about 2 to 20% of water by weight, based on the aluminum chloride, and immediately contacting the olefines with from about 2 to 10% by weight of said aluminum chloride based on the olefines to effect their polymerization, the conditions of reaction and the proportions of materials being such as to produce a polymerized product having a higher viscosity and a lower bromine number as compared with a product produced under the same conditions but without the ratio of water set forth.

3. In the process of producing synthetic lubricating oils by polymerizing long chain olefines of the type produced in the vapor phase cracking of paraffin, the improvement comprising contacting said olefines with from about 2 to 10% by weight of aluminum chloride based on the olefines to effect at least partial polymerization of said olefines, adding to the resulting reaction mixture about 2 to 20% by weight of water, based on the aluminum chloride, and further reacting the mixture, the conditions of reaction and the proportions of materials being such as to produce a polymerized product having a higher viscosity and a lower bromine number as compared with a product produced under the same conditions but without the ratio of water set forth.

4. In the process of producing synthetic lubricating oils by polymerizing long chain olefines of the type produced in the vapor phase cracking of paraffin, the improvement comprising alternately adding small proportions of anhydrous aluminum chloride and water to said olefines under conditions to avoid an excessive rise in temperature, and reacting the resulting mixture to effect polymerization of said olefines, the total quantity of aluminum chloride being from about 2 to 10% by weight based on the olefines, and the total quantity of water being from about 2 to 20% by weight based on the aluminum chloride, the conditions of reaction and the proportions of materials being such as to produce a polymerized product having a higher viscosity and a lower bromine number as compared with a product produced under the same conditions but without the ratio of water set forth.

JOHANNES NICOLAAS JACOBUS PERQUIN.